Patented Dec. 27, 1932

1,892,242

UNITED STATES PATENT OFFICE

MAX ALBERT KUNZ, OF MANNHEIM, AND KARL KOEBERLE AND ERICH BERTHOLD, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

SUBSTITUTION PRODUCTS OF DIBENZOPYRENEQUINONES

No Drawing. Application filed July 20, 1929, Serial No. 379,867, and in Germany July 26, 1928.

The present invention relates to the production of substitution products of dibenzopyrenequinones from the corresponding amino compounds.

We have found that very uniform substitution products of 3.4.8.9-dibenzopyrene-5.10-quinone and its derivatives, are obtained by diazotizing the amino group of monoamino - 3.4.8.9 - dibenzopyrene-5.10-quinones and replacing the diazo group by a halogen, cyano-, thiocyano- and hydroxy group. When the diazo group is replaced by cyano- or thiocyano groups these may be saponified to carboxylic and mercapto groups.

The monoaminodibenzopyrenequinones may be obtained by reduction of the corresponding nitro compounds which may be produced by acting on 3.4.8.9-dibenzopyrene-5.10-quinone, or derivatives thereof, such as for example halogen and alkyl derivatives, with a mixture of organic diluents, such as nitro-benzene, and nitric acid, whereby mononitro derivatives are obtained.

The products obtained by the replacement of the diazo group are in part dyestuffs themselves, for example the halogen derivatives, and in part valuable intermediate products for the preparation of vat dyestuffs, for example those substituted by oxygen containing radicles viz. hydroxy or carboxylic groups, which are converted into valuable vat dyestuffs by etherification or esterification. The ethers of monohydroxy-3.4.8.9-dibenzopyrene-5.10-quinones may, for example, be obtained by the action of dimethylsulphate, the aliphathic or aromatic esters of p-toluenesulphonic acid, such as the methyl, ethyl, ethylene, chlorethylene, phenyl and like esters on monohydroxy-3.4.8.9-dibenzopyrene-5.10-quinones.

The monohydroxy-3.4.8.9-dibenzopyrene-5.10-quinone obtainable according to our invention materially differs from that already known which is produced synthetically, which difference is probably due to the different position of the hydroxy group which in the product hitherto known is attached to the pyrene nucleus, whereas in the monohydroxy compound produced by starting from the mononitro compound is most probably attached to one of the benzene nuclei connected to the pyrene nucleus.

The following examples will further illustrate how the invention is carried out in practice, but the invention is not restricted thereto. The parts are by weight.

Example 1

7 parts of monoamino-3.4.8.9-dibenzopyrene-5.10-quinone (obtainable by reduction of the corresponding mononitro compound which may be prepared by acting on 3.4.8.9-dibenzopyrene-5.10-quinone with a mixture of nitrobenzene and nitric acid) are dissolved in sulphuric acid and are diazotized in the usual manner by means of nitrose (a solution of $N_2O_3$ in concentrated sulphuric acid) or a nitrite. The diazo-sulphate so obtained is converted into monoiododibenzopyrenequinone, either directly or after dilution with ice while stirring, by means of the calculated quantity of potassium iodide in water. The reaction is completed by heating at 70° C. while stirring until the evolution of nitrogen ceases, and the reaction product is filtered off by suction and dried. The monoiododibenzopyrenequinone thus obtained is a brown powder which dissolves in concentrated sulphuric acid to give a red violet coloration. With an alkaline hydrosulphite solution it gives a red vat from which cotton is dyed in yellow shades. It is soluble in organic solvents of high boiling point, and crystallizes in brown yellow needles.

In an analogous manner other monosubstitution products of the said dibenzopyrenequinone, for example chloro- or bromo-dibenzopyrenequinones are obtained by employing the corresponding quantity of cuprous chloride or cuprous bromide instead of potassium iodide. The derivatives of dibenzopyrenequinone thus obtained shew similar behaviour in dyeing to the monoiodo derivative described above.

Example 2

7 parts of the monoamino-3.4.8.9-dibenzopyrene-5.10-quinone of the foregoing example are diazotized, as described in the said example, and the solution of diazo-sulphate thus obtained is heated to from 100° to 110° C. nitrogen is evolved. The reaction is ended when a test portion changes to a blue green colour with alkali. After cooling the whole is poured on ice, and the reaction product is filtered off by suction and dried. The monohydroxy-dibenzopyrenequinone, obtained as a brown powder, is soluble in sulphuric acid to give a red violet colour, and is soluble in an aqueous solution of caustic alkali with great difficulty. The colour of the solution in an alcoholic solution of caustic alkali is blue green, and red brown monohydroxydibenzopyrenequinone is reprecipitated from this solution by the addition of acid. It dyes the vegetable fiber brown shades which do not change when treated with an acid.

*Example 3*

7 parts of the monohydroxydibenzopyrenequinone obtainable as described in the foregoing example are heated to boiling in 30 times the quantity of nitrobenzene together with 7 parts of p-toluene-sulphonic acid methyl ester and 5 parts of potassium carbonate until the formation of the dyestuff is complete. After cooling, filtering off the solvent by suction and washing out the potassium carbonate, the dyestuff is obtained as an orange red powder, which dissolves in concentrated sulphuric acid to give a red violet coloration, and which gives a red vat with hydrosulphite from which cotton is dyed in bright orange shades.

Similar dyestuffs are obtained by employing other esters of p-toluenesulphonic acid.

*Example 4*

34,7 parts of monoamino-3.4.8.9-dibenzopyrene-5.10-quinone are dissolved in 350 parts of concentrated sulphuric acid and diazotized in the usual manner by means of nitrose. The diazosulphate solution is introduced after the addition of about 700 parts of ice into an aqueous solution of 25 parts of potassium thiocyanate while stirring, the thiocyanodibenzopyrenequinone separating out in the form of orange flakes. The reaction mixture is then warmed at about 70° C. until the evolution of nitrogen ceases. The reaction product is then filtered by suction and forms a red-yellow powder dissolving to a blue solution with a red tinge in concentrated sulphuric acid and dyes cotton from a red vat strong red-yellow shades.

*Example 5*

34,7 parts of monoamino-3.4.8.9-dibenzopyrene-5.10-quinone are diazotized in the manner described in the foregoing example and the diazosulphate solution is introduced after dilution with ice into a solution of cuprous cyanide, prepared by dissolving 75 parts of copper sulphate and 80 parts of potassium cyanide in 500 parts of water, the cyanodibenzopyrenequinone immediately separating out in the form of orange flakes. The reaction mixture is then worked up as usual. The reaction product dissolves to a violet solution in concentrated sulphuric acid and dyes cotton from a red vat clear golden yellow shades.

*Example 6*

10 parts of monoamino-3.4.8.9-dibenzopyrene-5.10-quinone are slowly heated while stirring to 150° C. with 20 parts of caustic potash and 200 parts of ethyl alcohol. The reaction mixture is kept at the said temperature until a sample dissolves in an aqueous solution of caustic alkali giving a golden yellow solution. After cooling the reaction mixture is poured into water and the dibenzopyrenequinone monocarboxylic acid precipitated from the alkaline solution by acidification with a mineral acid. It is a red-yellow powder dissolving to a red-blue solution in concentrated sulphuric acid and can be recrystallized from solvents of high boiling point, such as for example nitrobenzene or trichlorobenzene wherein it is soluble with a yellow coloration. Purification may also be effected by means of the alkali metal or alkaline earth metal salts or by means of the oxonium sulphate separating from its solution in concentrated sulphuric acid by the addition of water, ice or dilute sulphuric acid.

What we claim is:

1. As a new article of manufacture the monohydroxy - 3.4.8.9 - dibenzopyrene - 5.10-quinone forming a brown powder, dissolving in concentrated sulphuric acid to give a red violet colour, very difficultly soluble in an aqueous solution of caustic alkali, soluble in an alcoholic solution of caustic alkali to give a blue green solution from which it separates as a red brown precipitate by the addition of an acid, and dyeing the vegetable fiber from a red vat brown shades which do not change when treated with an acid, the hydroxy group being introduced into the dibenzopyrenequinone molecule by a process comprising substituting a diazotized amino group.

2. As a new article of manufacture monomethoxy-3.4.8.9- dibenzopyrene-5.10-quinone forming an orange red powder, dissolving in concentrated sulphuric acid to give a red violet coloration and dyeing cotton from a red vat bright orange shades, the methoxy group being introduced into the dibenzopyrene-quinone molecule by a process comprising substituting a diazotized amino group.

3. As new articles of manufacture, uniform compounds corresponding to the formula: R—X in which R stands for the radicle of 3.4.8.9-dibenzopyrene-5.10-quinone and X for a hydroxy or alkoxy group, which groups are introduced into the dibenzopyrenequinone molecule by a process comprising substituting a diazotized amino group.

In testimony whereof we have hereunto set our hands.

MAX ALBERT KUNZ.
KARL KOEBERLE.
ERICH BERTHOLD.